(12) United States Patent
Hashimoto

(10) Patent No.: US 8,103,394 B2
(45) Date of Patent: Jan. 24, 2012

(54) HYBRID VEHICLE AND CONTROL METHOD THEREOF

(75) Inventor: Toshiya Hashimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1010 days.

(21) Appl. No.: 12/071,269

(22) Filed: Feb. 19, 2008

(65) Prior Publication Data

US 2008/0228334 A1 Sep. 18, 2008

(30) Foreign Application Priority Data

Mar. 14, 2007 (JP) ................................ 2007-65538

(51) Int. Cl.
*B60W 20/00* (2006.01)
*B60W 30/14* (2006.01)

(52) U.S. Cl. ............. 701/22; 701/70; 701/93; 701/96; 180/170; 903/903; 903/915; 477/3

(58) Field of Classification Search .............. 701/22; 903/902
See application file for complete search history.

(56) References Cited

U.S. PATENT DOCUMENTS

| | | | |
|---|---|---|---|
| 5,048,631 A * | 9/1991 | Etoh | 180/179 |
| 6,470,257 B1 * | 10/2002 | Seto | 701/96 |
| 6,853,903 B2 * | 2/2005 | Michi et al. | 701/93 |
| 2007/0032913 A1 * | 2/2007 | Ghoneim et al. | 701/1 |

FOREIGN PATENT DOCUMENTS

| | | |
|---|---|---|
| JP | 04-193629 | 7/1992 |
| JP | 2005-020820 A | 1/2005 |
| JP | 2005-124282 A | 5/2005 |
| JP | 2006-321466 A | 11/2006 |
| JP | 2007-069625 A | 3/2007 |
| JP | 2007069625 A * | 3/2007 |
| JP | 2007-091073 A | 4/2007 |

* cited by examiner

*Primary Examiner* — Thomas Black
*Assistant Examiner* — Lin B Olsen
(74) *Attorney, Agent, or Firm* — Kenyon & Kenyon LLP

(57) ABSTRACT

During execution of an auto cruise function, in response to selection of a power mode, when an measured accelerator opening Acc is less than a preset opening Accref, a hybrid vehicle of the invention sets a power mode cancellation flag Fpmc to 1 and a power mode enabling flag Fpm to 0 (steps S540 and S550). This prohibits the use of an accelerator opening setting map in the power mode for execution of the auto cruise function. In the power mode, in response to an instruction for enabling the auto cruise function, the hybrid vehicle keeps the power mode enabling flag Fpm to the setting of 1 (step S560) as long as the measured accelerator opening Acc is not less than the preset opening Accref. This allows the use of the accelerator opening setting map in the power mode for execution of the auto cruise function.

14 Claims, 9 Drawing Sheets

HYBRID VEHICLE AND CONTROL METHOD THEREOF

BACKGROUND OF THE INVENTION

1. Field of the Invention

The present invention relates to a hybrid vehicle equipped with an internal combustion engine and a motor respectively functioning to output driving power, and a control method of such a hybrid vehicle.

2. Description of the Prior Art

One known design of the hybrid vehicle has an auto cruise function enabling automatic constant-speed driving without requiring the driver's accelerator operation (see, for example, Japanese Patent Laid-Open No. 2005-020820). Another known design of the hybrid vehicle enables selection of a drive mode between a normal drive mode and a sports drive mode (see, for example, Japanese Patent Laid-Open No. 2005-124282). In selection of the normal drive mode, the hybrid vehicle sets a torque demand required for driving based on the driver's accelerator operation amount and subsequently sets a target drive point (defined by a combination of a target rotation speed and a target torque) of an internal combustion engine or a motor based on the torque demand. In selection of the sports drive mode, on the other hand, the hybrid vehicle specifies a minimum engine rotation speed as a lower limit of the engine rotation speed corresponding to the vehicle speed and sets the target drive point of the internal combustion engine to keep the engine rotation speed higher than the minimum engine rotation speed.

Combined application of the selection of the drive mode with the auto cruise function for attaining, for example, constant-speed driving desirably satisfies the driver's diverse needs. The hybrid vehicle of this application may, however, require undesirably complicated control or cause the driver to feel awkward in a certain combination of the drive mode and the auto cruise function.

SUMMARY OF THE INVENTION

In a hybrid vehicle allowing execution of a preset auto cruise function and arbitrary selection of a desired drive mode among multiple available drive modes, there would be a demand for enabling adequate execution of the auto cruise function.

The present invention accomplishes at least part of the demands mentioned above by the following configurations applied to the hybrid vehicle and the control method of the hybrid vehicle.

One aspect of the invention pertains to a hybrid vehicle including: an internal combustion engine configured to output power for driving; a motor configured to output power for driving; an accumulator configured to transmit electric power to and from the motor; an accelerator operation amount detector configured to acquire an amount of a driver's accelerator operation; a drive mode selector configured to select an object drive mode between a first drive mode for ordinary driving and a second drive mode having a tendency of a better response of power output to the driver's accelerator operation than a response in the first drive mode; an auto cruise selector configured to give an instruction for enabling a preset auto cruise function; and a controller configured to, in the case of no instruction for enabling the preset auto cruise function, control the internal combustion engine and the motor to ensure output of a power equivalent to a driving force demand, which is set based on the acquired amount of the driver's accelerator operation and a driving force setting restriction corresponding to either the first drive mode or the second drive mode selected as the object drive mode, and, in the case of the instruction for enabling the preset auto cruise function, to control the internal combustion engine and the motor to ensure output of a power equivalent to the driving force demand, which is set based on a restriction for execution of the preset auto cruise function without using a driving force setting restriction corresponding to the second drive mode, regardless of selection of either the first drive mode or the second drive mode as the object drive mode.

The hybrid vehicle according to one aspect of the invention enables selection of the object drive mode between the first drive mode for ordinary driving and the second drive mode having the tendency of the better response of power output to the driver's accelerator operation than the response in the first drive mode. In the case of no instruction for enabling the preset auto cruise function, the internal combustion engine and the motor are controlled to ensure output of a power equivalent to the driving force demand, which is set based on the acquired amount of the driver's accelerator operation and the driving force setting restriction corresponding to either the first drive mode or the second drive mode selected as the object drive mode. In the case of the instruction for enabling the preset auto cruise function, on the other hand, the internal combustion engine and the motor are controlled to ensure output of a power equivalent to the driving force demand, which is set based on the restriction for execution of the preset auto cruise function without using the driving force setting restriction corresponding to the second drive mode, regardless of selection of either the first drive mode or the second drive mode as the object drive mode. The second drive mode having the tendency of the better response of power output to the driver's accelerator operation than the response in the first drive mode for ordinary driving is typically selected in response to requirement for a relatively large driving force, for example, at the time of acceleration or hill climbing. There is a very little possibility for the driver's selection of the second drive mode in combination with the instruction for enabling the auto cruise function having basically no requirement for the accelerator operation. When the driver gives the instruction for enabling the auto cruise function, the hybrid vehicle executes the auto cruise function without using the driving force setting restriction corresponding to the second drive mode, regardless of selection of either the first drive mode or the second drive mode as the object drive mode. Such relatively simple control ensures adequate execution of the auto cruise function with preventing the driver from feeling awkward with a variation in driving force.

In one preferable application of the hybrid vehicle according to one aspect of the invention, in the case of the instruction for enabling the preset auto cruise function with selection of the second drive mode as the object drive mode, the controller controls the internal combustion engine and the motor to ensure output of a power equivalent to the driving force demand, which is set based on the acquired amount of the driver's accelerator operation and the driving force setting restriction corresponding to the second drive mode, as long as the acquired degree of the driver's accelerator operation is not less than a preset reference degree. In the case of the driver's instruction for enabling the auto cruise function with selection of the second drive mode, a relatively large driving force may be required, for example, with a view to overtaking the leading vehicle or climbing on the upslope. During selection of the second drive mode as the object drive mode, in response to the driver's instruction for enabling the auto cruise function, the hybrid vehicle of this application is allowed to be driven in the second drive mode as long as the degree of the driver's accelerator operation is not less than the preset reference degree. Such control ensures the good response to the driver's requirement and thereby improves the operability of the vehicle. Even in the case of the driver's instruction for enabling the auto cruise function with selection of the second drive mode, when the degree of the driver's accelerator operation is less than the preset reference degree or after the degree of the driver's accelerator operation decreases below the preset reference degree, the auto cruise function is executed without using the driving force setting restriction corresponding to the second drive mode. Such control effectively prevents the driver from feeling awkward due to non-execution of the desired auto cruise function against the driver's instruction.

In one preferable embodiment according to the above aspect of the invention, the hybrid vehicle further has a driving force demand setting module configured to, in the case of no instruction for enabling the preset auto cruise function, set the driving force demand based on the acquired amount of the driver's accelerator operation and the driving force setting restriction corresponding to either the first drive mode or the second drive mode selected as the object drive mode, and, in the case of the instruction for enabling the preset auto cruise function, to set the greater between a first tentative driving force demand based on a predetermined auto cruise-related driving parameter and a second tentative force demand based on the acquired amount of the driver's accelerator operation and a driving force setting restriction corresponding to the first drive mode, to the driving force demand. The hybrid vehicle of this arrangement ensures accurate execution of the auto cruise function while allowing the driver to give a request for increasing the driving force through the accelerator operation.

In the hybrid vehicle of this embodiment, in the case of the instruction for enabling the preset auto cruise function with selection of the second drive mode as the object drive mode, the driving force demand setting module may set the greater between the first tentative driving force demand based on the predetermined auto cruise-related driving parameter and the second tentative driving force demand based on the acquired amount of the driver's accelerator operation and the driving force setting restriction corresponding to the second drive mode, to the driving force demand as long as the acquired degree of the driver's accelerator operation is not less than a preset reference degree. In the case of the instruction for enabling the auto cruise function with selection of the second drive mode, the hybrid vehicle of this arrangement is adequately allowed to be driven in the second drive mode, as long as the degree of the driver's accelerator operation is not less than the preset reference degree.

In one preferable embodiment according to the above aspect of the invention, the hybrid vehicle further has a power transmission structure constructed to have an axle rotational element connecting with a specific axle and an engine rotational element connecting with an engine shaft of the internal combustion engine and allowing differential rotation relative to the axle rotational element and configured to enable output of at least part of power from the engine shaft to the axle, wherein the motor outputs power to either the specific axle or another axle different from the specific axle. Furthermore, the power transmission structure may have an electric power-mechanical power input output assembly constructed to connect with the axle and with the engine shaft of the internal combustion engine and configured to enable at least part of the output power of the internal combustion engine to the axle and transmission of electric power to and from the accumulator through input and output of electric power and mechanical power. Moreover, the electric power-mechanical power input output assembly may have: a generator configured to input and output power; and a three shaft-type power input output structure constructed to connect with three shafts, the axle, the engine shaft of the internal combustion engine, and a rotating shaft of the generator and configured to input and output power to and from a residual shaft based on powers input to and output from any two shafts among the three shafts.

Another aspect of the invention pertains to a control method of a hybrid vehicle. The hybrid vehicle has: an internal combustion engine configured to output power for driving; a motor configured to output power for driving; an accumulator configured to transmit electric power to and from the motor; an accelerator operation amount detector configured to acquire an amount of a driver's accelerator operation; a drive mode selector configured to select an object drive mode between a first drive mode for ordinary driving and a second drive mode having a tendency of a better response of power output to the driver's accelerator operation than a response in the first drive mode; and an auto cruise selector configured to give an instruction for enabling a preset auto cruise function, The control method includes the step of: (a) in the case of no instruction for enabling the preset auto cruise function, controlling the internal combustion engine and the motor to ensure output of a power equivalent to a driving force demand, which is set based on the acquired amount of the driver's accelerator operation and a driving force setting restriction corresponding to either the first drive mode or the second drive mode selected as the object drive mode, while, in the case of the instruction for enabling the preset auto cruise function, controlling the internal combustion engine and the motor to ensure output of a power equivalent to the driving force demand, which is set based on a restriction for execution of the preset auto cruise function without using a driving force setting restriction corresponding to the second drive mode, regardless of selection of either the first drive mode or the second drive mode as the object drive mode.

When the driver gives the instruction for enabling the auto cruise function, the control method enables the hybrid vehicle to execute the auto cruise function without using the driving force setting restriction corresponding to the second drive mode, regardless of selection of either the first drive mode or the second drive mode as the object drive mode. Such relatively simple control ensures adequate execution of the auto cruise function with preventing the driver from feeling awkward with a variation in driving force.

In the control method of this embodiment, the step(a) in the case of the instruction for enabling the preset auto cruise function with selection of the second drive mode as the object drive mode, may control the internal combustion engine and the motor to ensure output of a power equivalent to the driving force demand, which is set based on the acquired amount of the driver's accelerator operation and the driving force setting restriction corresponding to the second drive mode, as long as the acquired degree of the driver's accelerator operation is not less than a preset reference degree.

The control method of the invention may include the step of: (b) in the case of no instruction for enabling the preset auto cruise function, setting the driving force demand based on the acquired amount of the driver's accelerator operation and the driving force setting restriction corresponding to either the first drive mode or the second drive mode selected as the object drive mode, while, in the case of the instruction for enabling the preset auto cruise function, setting the greater between a first tentative driving force demand based on a predetermined auto cruise-related driving parameter and a second tentative force demand based on the acquired amount of the driver's accelerator operation and a driving force setting restriction corresponding to the first drive mode, to the driving force demand.

In the control method of this embodiment, the step (b) in the case of the instruction for enabling the preset auto cruise function with selection of the second drive mode as the object drive mode, may set the greater between the first tentative driving force demand based on the predetermined auto cruise-related driving parameter and the second tentative driving force demand based on the acquired amount of the driver's accelerator operation and the driving force setting restriction corresponding to the second drive mode, to the driving force demand as long as the acquired degree of the driver's accelerator operation is not less than a preset reference degree.

In the control method of the invention, it is preferable that the hybrid vehicle further has: a power transmission structure constructed to have an axle rotational element connecting with a specific axle and an engine rotational element connecting with an engine shaft of the internal combustion engine and allowing differential rotation relative to the axle rotational element and configured to enable output of at least part of power from the engine shaft to the axle, wherein the motor outputs power to either the specific axle or another axle different from the specific axle.

In one preferable application of the control method of the invention, the power transmission structure has an electric power-mechanical power input output assembly constructed to connect with the axle and with the engine shaft of the internal combustion engine and configured to enable at least part of the output power of the internal combustion engine to the axle and transmission of electric power to and from the accumulator through input and output of electric power and mechanical power.

In another preferable application of the control method of the invention, the electric power-mechanical power input output assembly has: a generator configured to input and output power; and a three shaft-type power input output structure constructed to connect with three shafts, the axle, the engine shaft of the internal combustion engine, and a rotating shaft of the generator and configured to input and output power to and from a residual shaft based on powers input to and output from any two shafts among the three shafts.

DESCRIPTION OF THE PREFERRED EMBODIMENTS

One mode of carrying out the invention is discussed below as a preferred embodiment.

Figure 1:
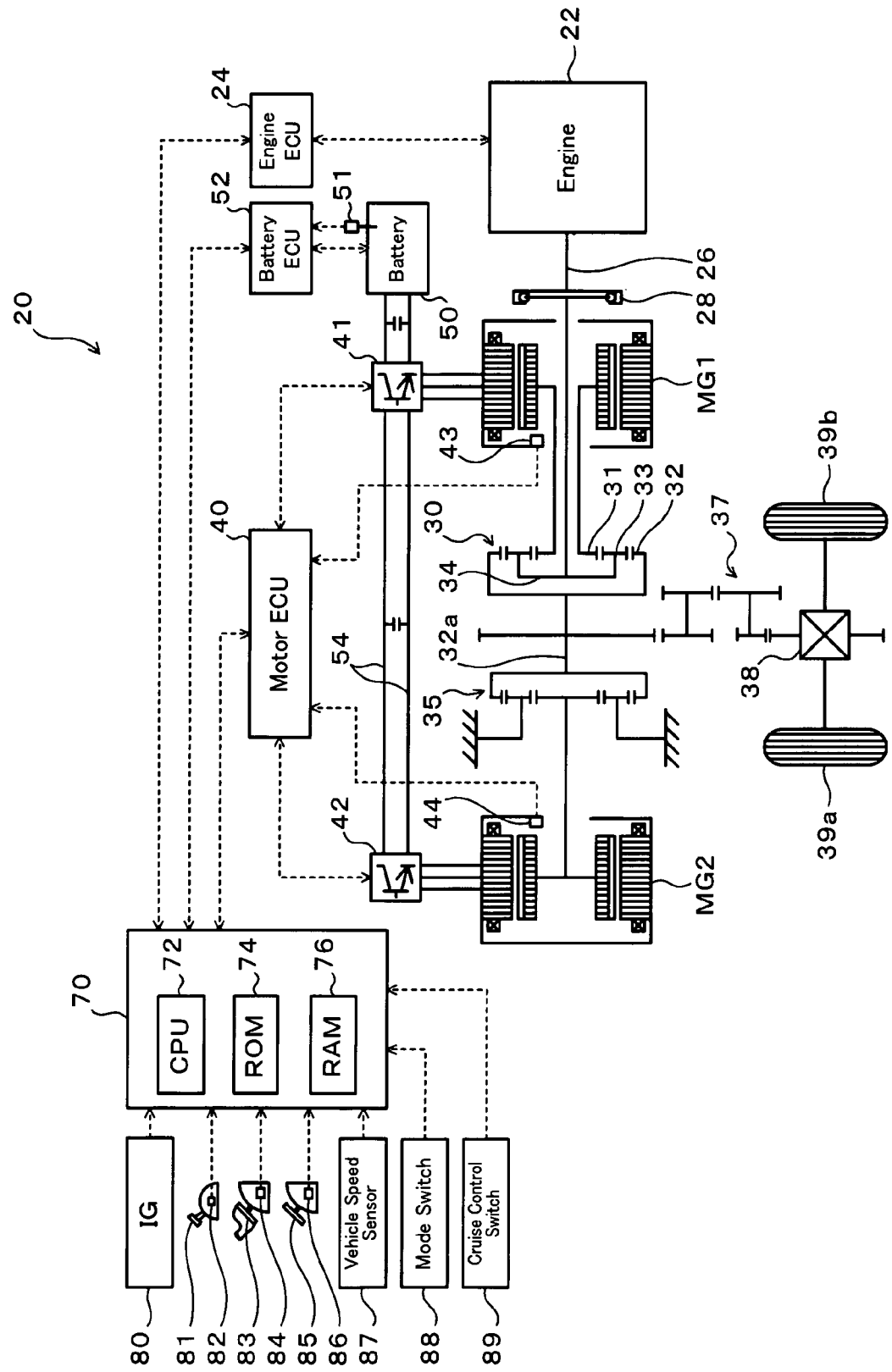
FIG. 1 schematically illustrates the configuration of a hybrid vehicle according to one embodiment of the invention.

FIG. 1 schematically illustrates the construction of a hybrid vehicle 20 in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as an axle connected with the power distribution integration mechanism 30, another motor MG2 that is linked with the reduction gear 35, and a hybrid electronic control unit 70 (hereafter referred to as 'hybrid ECU') that controls the whole hybrid vehicle 20.

The engine 22 is an internal combustion engine that receives a supply of a hydrocarbon fuel, such as gasoline or light oil, and outputs power. The engine 22 is under control of an engine electronic control unit (hereafter referred to as engine ECU) 24 and is subjected to, for example, fuel injection control, ignition control, and intake air control. The engine ECU 24 inputs diverse signals from various sensors that are provided for the engine 22 to measure and detect the operating conditions of the engine 22. The engine ECU 24 establishes communication with the hybrid ECU 70 to drive and control the engine 22 in response to control signals from the hybrid ECU 70 and with reference to the diverse signals from the various sensors and to output data regarding the operating conditions of the engine 22 to the hybrid ECU 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34 as an engine rotational element, the sun gear 31, and the ring gear 32 as an axle rotational element in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the wheels 39a and 39b via the gear mechanism 37, and the differential gear 38 from ring gear shaft 32a.

Both the motors MG1 and MG2 are known synchronous motor generators that are driven as a generator and as a motor. The motors MG1 and MG2 transmit electric power to and from a battery 50 such as a secondary battery via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 executes a rotation speed computation routine (not shown) and computes rotation speeds Nm1 and Nm2 of respective rotors in the motors MG1 and MG2 from the signals input from the rotational position detection sensors 43 and 44. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 and engine ECU 24 via communication according to the requirements. The battery ECU 52 also performs various computations and settings required for management and control of the battery 50. A remaining charge or state of charge SOC of the battery 50 is calculated from an integrated value of charge-discharge current measured by a current sensor. A charge-discharge electric power Pb* of the battery 50 is set corresponding to the calculated state of charge SOC. An input limit Win as an allowable charging electric power to be charged in the battery 50 and an output limit Wout as an allowable discharging electric power to be discharged from the battery 50 are set corresponding to the calculated state of charge SOC and a battery temperature Tb. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch (start switch) 80, a gearshift position SP from a gearshift position sensor 82 that detects the current position of a gearshift lever 81 such as the gearshift position SP, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 87. The hybrid ECU 70 also inputs a mode signal from a mode switch 88 to set the driver's selected drive mode of the hybrid vehicle 20. In the structure of the embodiment, the mode switch 88 may be provided on an vehicle interior switch panel (not shown) and is operated by the driver for selection of a desired drive mode among multiple available modes. The available modes include a normal mode (first drive mode) for ordinary driving of the hybrid vehicle 20 with preference to the improved fuel consumption over the power performance and a power mode (second drive mode) for power driving of the hybrid vehicle 20 with preference to the power performance over the improved fuel consumption. In response to selection of the normal mode by the driver's operation of the mode switch 88, a mode switch flag Fms is set to 0, and the engine 22 and the motors MG1 and MG2 are controlled to enable efficient operation of the engine 22 for the improved fuel consumption. In response to selection of the power mode by the driver's operation of the mode switch 88, on the other hand, the mode switch flag Fms is set to 1, and the engine 22 and the motors MG1 and MG2 are controlled to output a higher torque to the ring gear shaft 32a or the axle than the torque output in the normal mode with simultaneously increasing the rotation speed of the engine 22 to enhance the response of torque output to the driver's accelerator operation. In the hybrid vehicle 20 of the embodiment, a cruise control switch 89 is provided, for example, in the neighborhood of a steering column. The cruise control switch 89 is operated to enable or cancel a desired auto cruise function, for example, constant speed driving of automatically maintaining the vehicle speed V constant or follow-up driving of keeping a certain distance from a vehicle ahead, without requiring the driver's accelerator operation. The cruise control switch 89 is also operated to set the vehicle speed and the inter-vehicle distance in the auto cruise drive. The cruise control switch 89 is connected to the hybrid ECU 70. In response to the driver's operation of the cruise control switch 89 to give an instruction for enabling a desired auto cruise function, a cruise switch flag Fcrs is set to 1, and the operations of the hybrid vehicle 20 are controlled according to preset control procedures for auto cruise by the hybrid ECU 70. The cruise switch flag Fcrs is set to 0 in the ordinary state (in a switch-off time or after cancellation of the auto cruise function). In the structure of the embodiment, the auto cruise function is enabled by the driver's switch-on operation of the cruise control switch 89 and is cancelled by the driver's switch-off operation of the cruise control switch 89 or the driver's depression of the brake pedal 85. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand Tr* to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand Tr* to the ring gear shaft 32a. The operation control mode of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
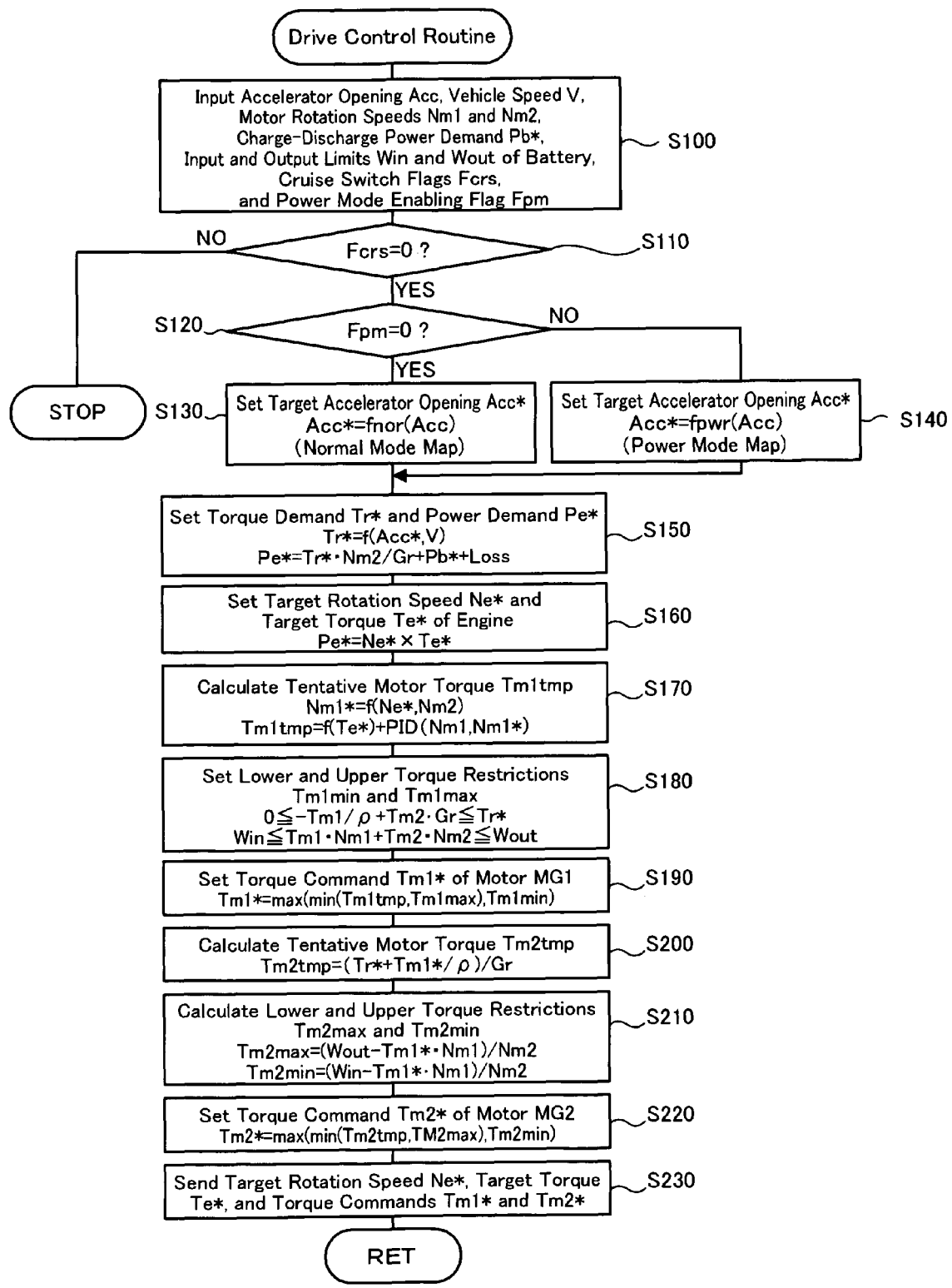
FIG. 2 is a flowchart showing a drive control routine executed by a hybrid ECU mounted on the hybrid vehicle of the embodiment.

The following description regards series of control performed in the hybrid vehicle 20 of the embodiment. FIG. 2 is a flowchart showing a drive control routine executed at preset time intervals (for example, at every several msec) by the hybrid ECU 70.

On the start of the drive control routine shown in FIG. 2, the CPU 72 of the hybrid ECU 70 first inputs various data required for control, that is, the accelerator opening Acc from the accelerator pedal position sensor 84, the vehicle speed V from the vehicle speed sensor 87, the rotation speeds Nm1 and Nm2 of the motors MG1 and MG2, the charge-discharge power demand Pb*, the input limit Win and the output limit Wout of the battery 50, the setting of the cruise switch flag Fcrs, and the setting of a power mode enabling flag Fpm (step S100). The rotation speeds Nm1 and Nm2 of the motors MG1 and MG2 are input from the motor ECU 40 by communication. The charge-discharge power demand Pb* and the input limit Win and the output limit Wout of the battery 50 are input from the battery ECU 52 by communication. The cruise switch flag Fcrs is set in response to the driver's operation of the cruise control switch 89 and is stored in a predetermined memory area. The power mode enabling flag Fpm is set to 0 to specify the normal mode as an object drive mode of the hybrid vehicle 20 and is set to 1 to specify the power mode as the object drive mode of the hybrid vehicle 20 according to a power mode requirement detection routine (described later). The setting of the power mode enabling flag Fpm is stored in a predetermined memory area.

Figure 3:
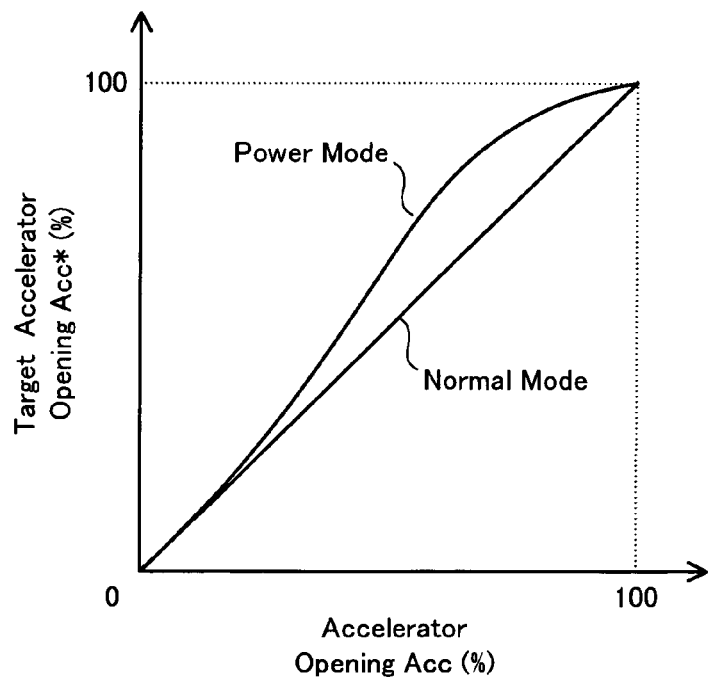
FIG. 3 shows accelerator opening setting maps in a normal mode and in a power mode.

After the data input at step S100, the CPU 72 determines whether the input setting of the cruise switch flag Fcrs is equal to 0 (step S110) and, in the case of the cruise switch flag Fcrs set to 0, sequentially determines whether the setting of the power mode enabling flag Fpm input at step S100 is equal to 0 (step S120). When the power mode enabling flag Fpm is equal to 0, it is determined that the object drive mode of the hybrid vehicle 20 is to be set to the normal mode. In this state, a target accelerator opening Acc* as a control object of accelerator opening is set corresponding to the accelerator opening Acc input at step S100 with reference to an accelerator opening setting map in the normal mode (step S130). When the power mode enabling flag Fpm is equal to 1, on the other hand, it is determined that the object drive mode of the hybrid vehicle 20 is to be set to the power mode. In this state, the target accelerator opening Acc* as the control object of accelerator opening is set corresponding to the accelerator opening Acc input at step S100 with reference to an accelerator opening setting map in the power mode (step S140). The accelerator opening setting map in the normal mode is prepared in advance to have a linearity of the target accelerator opening Acc* relative to the accelerator opening Acc over a whole range of 0% to 100% and is stored in the ROM 74. As shown in FIG. 3, the accelerator opening setting map in the normal mode adopted in this embodiment sets the target accelerator opening Acc* equal to the accelerator opening Acc over the whole range of 0% to 100%. The accelerator opening setting map in the power mode is prepared in advance to have a specific characteristic curve and is stored in the ROM 74. As shown in FIG. 3, the accelerator opening setting map in the power mode adopted in this embodiment sets the identical values with those in the accelerator opening setting map in the normal mode to the target accelerator opening Acc* against the accelerator opening Acc in a preset low accelerator opening range from 0%. This aims to prevent the driver from feeling an abrupt acceleration of the vehicle at the low vehicle speed. The accelerator opening setting map in the power mode sets the greater values than those in the accelerator opening setting map in the normal mode to the target accelerator opening Acc* against the accelerator opening Acc in a residual range to 100% other than the preset low accelerator opening range. This aims to enhance the response of torque output to the driver's accelerator operation.

Figure 4:
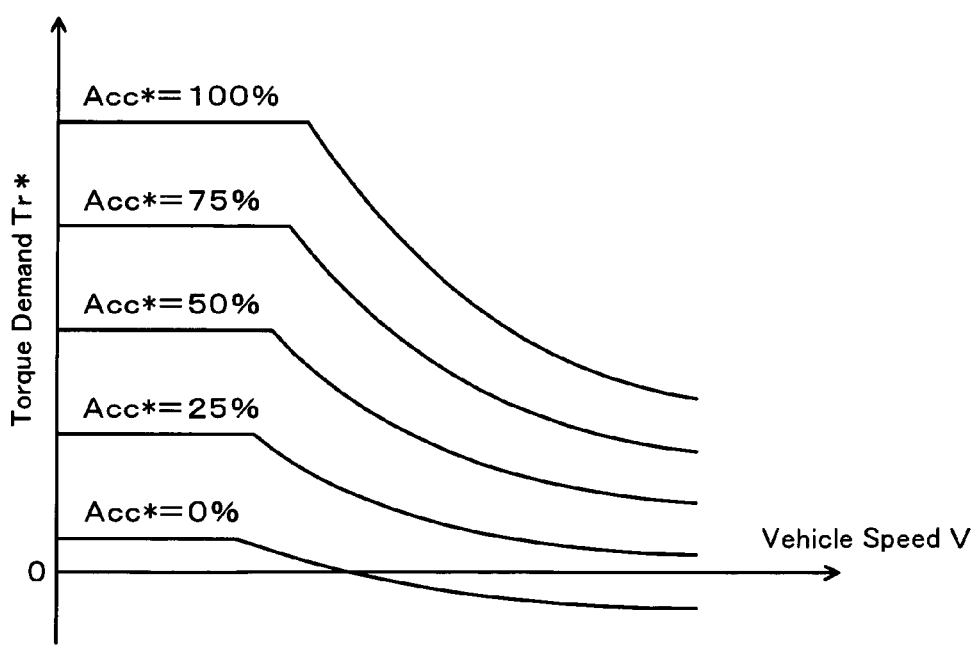
FIG. 4 shows one example of a torque demand setting map.
Figure 5:
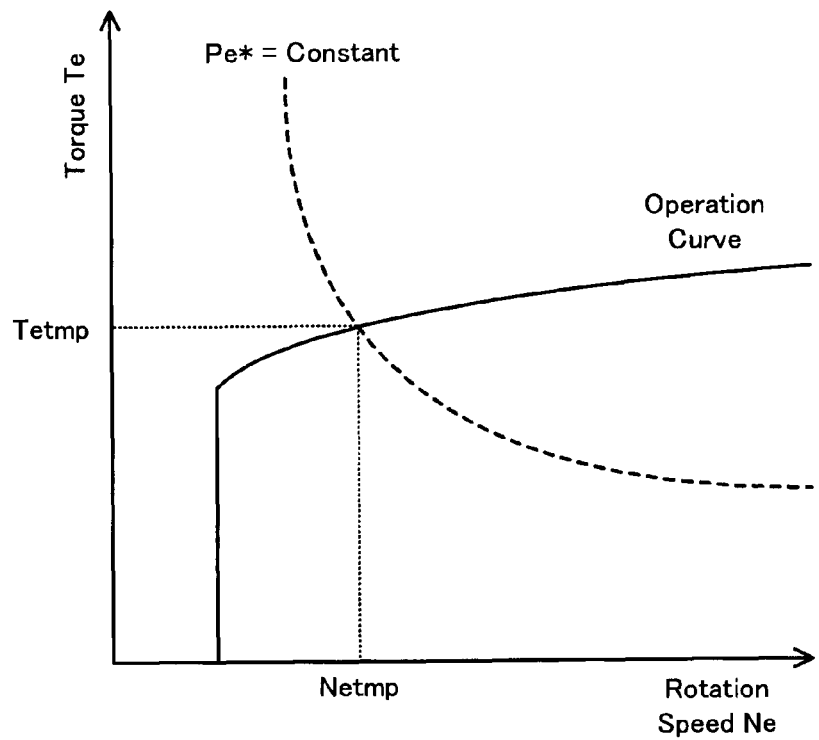
FIG. 5 shows an operation curve of an engine and a correlation curve of a torque Te to a rotation speed Ne.

The CPU 72 sets a torque demand Tr* to be output to the ring gear shaft 32a as an axle linked with the drive wheels 39a and 39b and a power demand Pe* required for the engine 22, based on the target accelerator opening Acc* set either at step S130 or at step S140 and the vehicle speed V input at step S100 (step S150). A concrete procedure of setting the torque demand Tr* in this embodiment stores in advance variations in torque demand Tr* against the target accelerator opening Acc* and the vehicle speed V as a torque demand setting map in the ROM 74 and reads the torque demand Tr* corresponding to the given target accelerator opening Acc* and the given vehicle speed V from this torque demand setting map. One example of the torque demand setting map is shown in FIG. 4. The power demand Pe* is calculated as the sum of the product of the set torque demand Tr* and a rotation speed Nr of the ring gear shaft 32a, the charge-discharge power demand Pb*, and a potential loss. The rotation speed Nr of the ring gear shaft 32a may be obtained by dividing the rotation speed Nm2 of the motor MG2 by a gear ratio Gr of the reduction gear 35 as shown in the flowchart of FIG. 2 or otherwise by multiplying the vehicle speed V by a preset conversion factor k. A target drive point of the engine 22 defined by a combination of a target rotation speed Ne* and a target torque Te* for efficient operation of the engine 22 is subsequently set corresponding to the power demand Pe* set at step S150 (step S160). In this embodiment, the target rotation speed Ne* and the target torque Te* of the engine 22 are determined according to an operation curve of ensuring efficient operation of the engine 22 and a curve of the power demand Pe*. FIG. 5 shows an operation curve of the engine 22 and a correlation curve of the target torque Te* to the target rotation speed Ne*. As clearly shown in FIG. 5, the target rotation speed Ne* and the target torque Te* are given as an intersection of the operation curve and the correlation curve of constant power demand Pe* (=Ne*×Te*).

After setting the target rotation speed Ne* and the target torque Te* of the engine 22, the CPU 72 calculates a target rotation speed Nm1* of the motor MG1 from the target rotation speed Ne*, the rotation speed Nr (=Nm2/Gr) of the ring gear shaft 32a, and a gear ratio ρ (the number of teeth of the sun gear 31/the number of teeth of the ring gear 32) of the power distribution integration mechanism 30 according to Equation (1) given below, and subsequently calculates a tentative motor torque Tm1*tmp* to be output from the motor MG1 from the calculated target rotation speed Nm1* and the current rotation speed Nm1 of the motor MG1 according to Equation (2) given below (step S170):

$$Nm1^* = Ne^* \cdot (1+\rho)/\rho - Nm2/(Gr \cdot \rho) \qquad (1)$$

$$Tm1tmp = -\rho/(1+\rho) \cdot Te^* + k1(Nm1^* - Nm1) + k2\int(Nm1^* - Nm1)dt \qquad (2)$$

Figure 6:
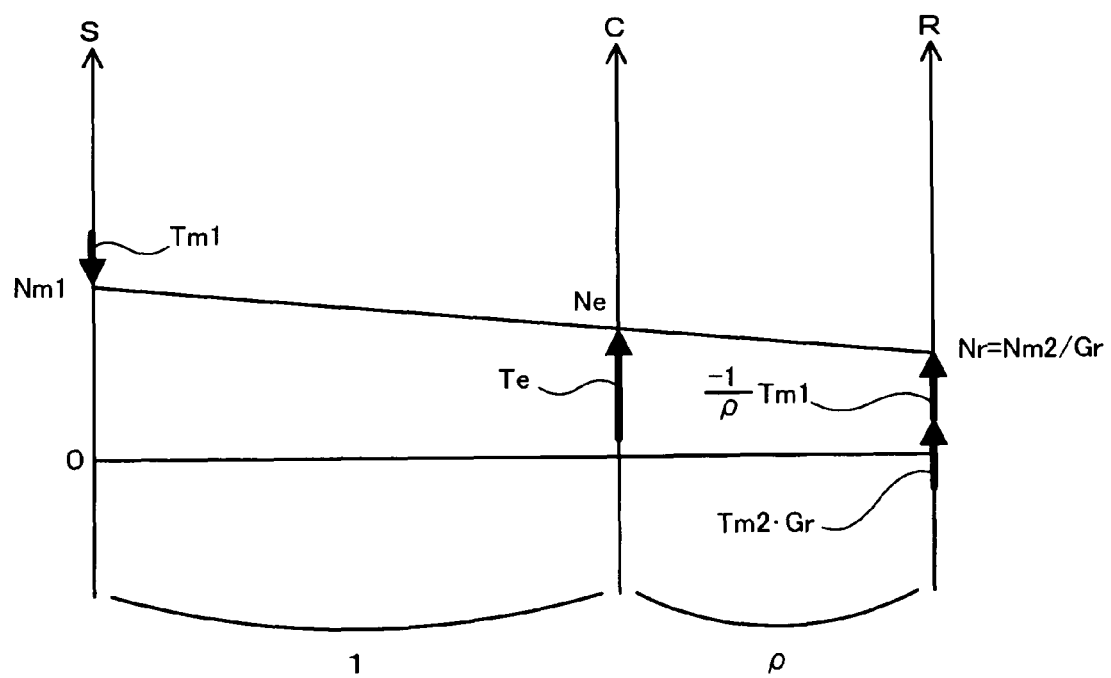
FIG. 6 is an alignment chart showing torque-rotation speed dynamics of respective rotational elements included in a power distribution integration mechanism in the hybrid vehicle of the embodiment.

Equation (1) is a dynamic relational expression of the rotational elements included in the power distribution integration mechanism 30. FIG. 6 is an alignment chart showing torque-rotation speed dynamics of the respective rotational elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Two thick arrows on the axis 'R' respectively show a torque transmitted to the ring gear shaft 32a by output of the torque Tm1 from the motor MG1, and a torque applied to the ring gear shaft 32a via the reduction gear 35 by output of the torque Tm2 from the motor MG2. Equation (1) for calculating the target rotation speed Nm1* of the motor MG1 is readily introduced from the torque-rotation speed dynamics in the alignment chart of FIG. 6. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term. The CPU 72 subsequently sets an upper torque restriction Tm1max and a lower torque restriction Tm1min as maximum and minimum torques that may be output from the motor MG1 to satisfy both Expressions (3) and (4) given below (step S180):

$$0 \leq -Tm1/\rho + Tm2 \cdot Gr \leq Tr^* \qquad (3)$$

$$Win \leq Tm1 \cdot Nm1 + Tm2Nm2 \leq Wout \qquad (4)$$

Figure 7:
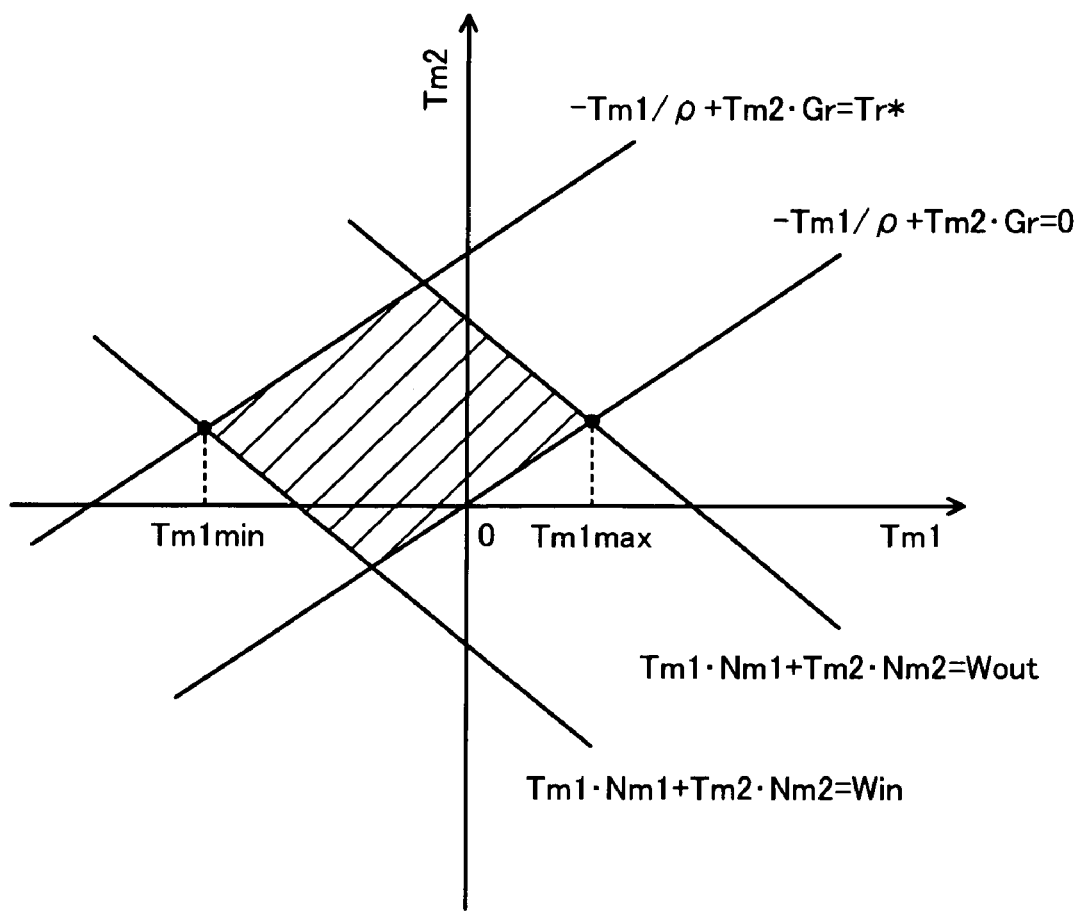
FIG. 7 shows a process of setting a lower torque restriction Tm1min and an upper torque restriction Tm1max.

A torque command Tm1* of the motor MG1 is set by limiting the calculated tentative motor torque Tm1*tmp* with the set upper torque restriction Tm1max and lower torque restriction Tm1min (step S190). Expression (3) is a relational expression showing that the sum of the torques output from the motors MG1 and MG2 to the ring gear shaft 32a is within a range of 0 to the torque demand Tr*. Expression (4) is a relational expression showing that the sum of the electric powers input into and output from the motors MG1 and MG2 is in a range of the input limit Win and the output limit Wout of the battery 50. The relation defined by Expressions (3) and (4) is shown in FIG. 7. As clearly understood from FIG. 7, the upper torque restriction Tm1max and the lower torque restriction Tm1min are obtained as a maximum value and a minimum value of the torque Tm1 in a hatched area.

After setting the torque command Tm1* of the motor MG1, the CPU 72 calculates a tentative motor torque Tm2*tmp* to be output from the motor MG2 from the torque demand Tr*, the torque command Tm1*, the gear ratio ρ of the power distribution integration mechanism 30, and the gear ratio Gr of the reduction gear 35 according to Equation (5) given below (step S200):

$$Tm2tmp = (Tr^* + Tm1^*/\rho)/Gr \qquad (5)$$

A lower torque restriction Tm2min and an upper torque restriction Tm2max as minimum and maximum torques that may be output from the motor MG2 are then calculated from the input limit Win and the output limit Wout of the battery 50, the torque command Tm1* of the motor MG1 set at step S190, and the current rotation speeds Nm1 and Nm2 of the motors MG1 and MG2 according to Equations (6) and (7) given below (step S210):

$$Tm2min = (Win - Tm1^* \cdot Nm1)/Nm2 \qquad (6)$$

$$Tm2max = (Wout - Tm1^* \cdot Nm1)/Nm2 \qquad (7)$$

A torque command Tm2* of the motor MG2 is set by limiting the calculated tentative motor torque Tm2*tmp* with the set upper torque restriction Tm2max and lower torque restriction Tm2min (step S220). Setting the torque command Tm2* of the motor MG2 in this manner restricts the torque output to the ring gear shaft 32a as the axle within the range of the input limit Win and the output limit Wout of the battery 50. Equation (5) is readily introduced from the alignment chart of FIG. 6. After setting the target rotation speed Ne* and the target torque Te* of the engine 22 and the torque commands Tm1* and Tm2* of the motors MG1 and MG2 as described above, the CPU 72 sends the target rotation speed Ne* and the target torque Te* of the engine 22 to the engine ECU 24 and the torque commands Tm1* and Tm2* of the motors MG1 and MG2 to the motor ECU 40 (step S230) and goes back to step S100 to repeat the above series of processing. The engine ECU 24 receives the settings of the target rotation speed Ne* and the target torque Te* and performs required controls to gain the target rotation speed Ne* and the target torque Te*. The motor ECU 40 receives the settings of the torque commands Tm1* and Tm2* and performs switching control of switching elements included in the respective inverters 41 and 42 to drive the motor MG1 with the torque command Tm1* and the motor MG2 with the torque command Tm2*. As described above, the drive control routine of FIG. 2 sets the greater value to the target accelerator opening Acc* in the power mode than the setting in the normal mode (step S140) when the power mode enabling flag Fpm is set equal to 1 (step S120). The greater value is accordingly set to the torque demand Tr* in the power mode than the setting in the normal mode. This desirably improves the response of torque output to the driver's accelerator operation. The hybrid vehicle 20 of the embodiment enables selection of the driver's desired drive mode among the multiple available drive modes to satisfy the driver's diverse needs.

Figure 8:
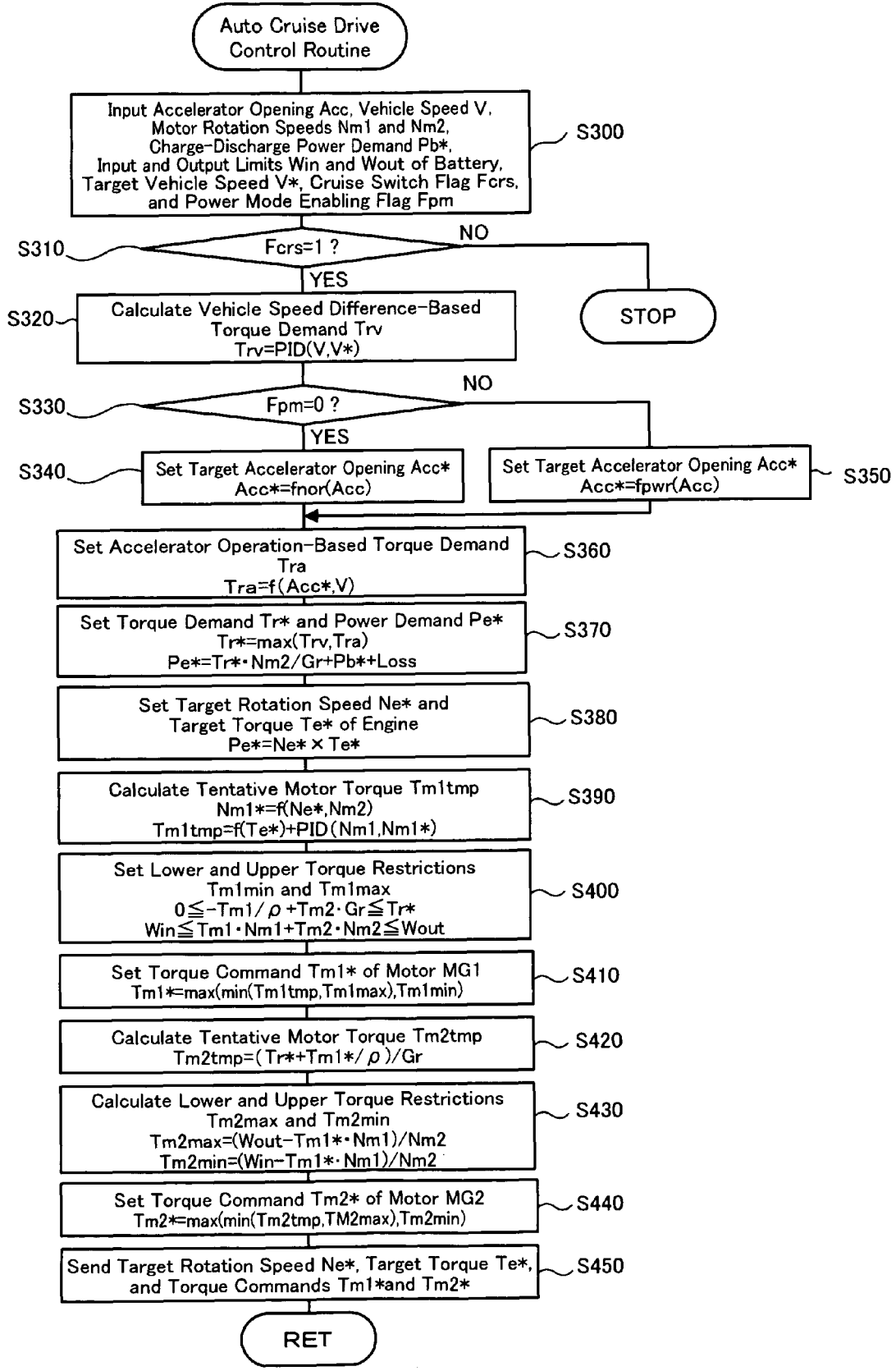
FIG. 8 is a flowchart showing an auto cruise drive control routine executed by the hybrid ECU.

When the input setting of the cruise switch flag Fcrs is equal to 1 at step S110, the CPU 72 immediately terminates the drive control routine of FIG. 2 and executes an auto cruise drive control routine as described below. FIG. 8 is a flowchart showing the auto cruise drive control routine executed at preset time intervals (for example, at every several msec) by the hybrid ECU 70 in the embodiment. For the simplicity of explanation, the following description of the auto cruise drive control routine of FIG. 8 is on the assumption that the driver's required auto cruise function is constant speed driving of automatically maintaining the vehicle speed V constant.

On the start of the auto cruise drive control routine shown in FIG. 8, the CPU 72 of the hybrid ECU 70 first inputs various data required for control, that is, the accelerator opening Acc from the accelerator pedal position sensor 84, the vehicle speed V from the vehicle speed sensor 87, the rotation speeds Nm1 and Nm2 of the motors MG1 and MG2, the charge-discharge power demand Pb*, the input limit Win and the output limit Wout of the battery 50, a target vehicle speed V*, the setting of the cruise switch flag Fcrs, and the setting of the power mode enabling flag Fpm (step S300). The target vehicle speed V* is set according to the driver's operation of the cruise control switch 89 and is stored in a predetermined memory area. After the data input at step S300, it is determined whether the input setting of the cruise switch flag Fcrs is equal to 1 (step S310). The setting of the cruise switch flag Fcrs to 0 means either the driver's non-requirement for the auto cruise function or the cancellation of the auto cruise function. In this case, the CPU 72 immediately terminates the auto cruise drive control routine.

When the cruise switch flag Fcrs is equal to 1 at step S310, on the other hand, the CPU 72 calculates a vehicle speed difference-based torque demand (first tentative driving force demand) Trv for cancelling out a difference (V*−V) between the target vehicle speed V* and the actual vehicle speed V input at step S300 according to Equation (8) given below (step S320):

$$Tr^* = k3 \cdot (V^* - V) + k4 \cdot \int (V^* - V) dt \quad (8)$$

Equation (8) is a relational expression of feedback control to make the vehicle speed V approach to the target vehicle speed V*. In Equation (8) given above, 'k3' in the first term and 'k4' in the second term on the right side respectively denote a gain of the proportional and a gain of the integral term. It is then determined whether the setting of the power mode enabling flag Fpm input at step S300 is equal to 0 (step S330). When the power mode enabling flag Fpm is equal to 0, the target accelerator opening Acc* as the control object of accelerator opening is set corresponding to the accelerator opening Acc input at step S300 with reference to the accelerator opening setting map in the normal mode (see FIG. 3) (step S340). When the power mode enabling flag Fpm is equal to 1, on the other hand, the target accelerator opening Acc* as the control object of accelerator opening is set corresponding to the accelerator opening Acc input at step S300 with reference to the accelerator opening setting map in the power mode (see FIG. 3) (step S350). The CPU 72 subsequently sets an accelerator operation-based torque demand (second tentative driving force demand) Tra as a torque demand caused by the driver's accelerator operation during execution of the auto cruise function, based on the set target accelerator opening Acc* and the vehicle speed V (step S360). A concrete procedure of setting the accelerator operation-based torque demand Tra in this embodiment refers to the torque demand setting map shown in FIG. 4 and reads the accelerator operation-based torque demand Tra corresponding to the given target accelerator opening Acc* and the given vehicle speed V. Setting the accelerator operation-based torque demand Tra aims to satisfy the driver's request for an increased driving force through the depression of the accelerator pedal 83 in order to, for example, overtake the leading vehicle, during execution of the auto cruise function when the driver basically does not operate the accelerator pedal 83. The CPU 72 subsequently sets the greater between the vehicle speed difference-based torque demand Trv and the accelerator operation-based torque demand Tra to the torque demand Tr* for control and sets the power demand Pe* required for the engine 22 in the same manner as step S150 in the drive control routine of FIG. 2 (step S370). The CPU 72 then executes the processing of steps S380 to S450, which is identical with the processing of steps S160 to S230 in the drive control routine of FIG. 2, and goes back to step S300 to repeat this series of processing.

As described above, in response to the instruction for enabling the auto cruise function, the hybrid vehicle 20 of the embodiment sets the torque demand Tr* required for driving (step S320 to S370), based on the auto cruise-related driving parameters, that is, based on the vehicle speed V and the target vehicle speed V* for constant speed driving or based on the inter-vehicle distance for follow-up driving. The target drive point (defined by the combination of the target rotation speed Ne* and the target torque Te*) for efficient operation of the engine 22 is set, based on the torque demand Tr* (step S380). The engine 22 and the motors MG1 and MG2 are then controlled to drive the engine 22 at the target drive point and ensure output of a torque equivalent to the torque demand Tr* (steps S390 to S450). The hybrid vehicle 20 of the embodiment thus ensures accurate execution of the auto cruise function required by the driver. In the hybrid vehicle 20 of the embodiment, the greater between the vehicle speed difference-based torque demand Trv and the accelerator operation-based torque demand Tra is set to the torque demand Tr* (step S370). Such control satisfies the driver's request for an increased driving force through the depression of the accelerator pedal 83 during execution of the auto cruise function when the driver basically does not operate the accelerator pedal 83. In the hybrid vehicle 20 of the embodiment, when the power mode enabling flag Fpm is equal to 1, the drive control sets the target accelerator opening Acc* as the control object of accelerator opening with reference to the accelerator opening setting map in the power mode (see FIG. 3) (step S350), sets the accelerator operation-based torque demand Tra based on the target accelerator opening Acc* (step S360), and sets the torque demand Tr* (step S370). In the case of the driver's selection of the power mode through the operation of the mode switch 88, however, unconditional setting of the acceleration operation-based torque demand Tra with reference to the accelerator opening setting map in the power mode during execution of the auto cruise function may interfere with adequate execution of the auto cruise function. In the hybrid vehicle 20 of the embodiment, a power mode requirement detection routine shown in the flowchart of FIG. 9 is executed to adequately set the power mode enabling flag Fpm.

The following description regards the power mode requirement detection routine to detect requirement or non-requirement for setting the object drive mode of the hybrid vehicle 20 to the power mode and set the power mode enabling flag Fpm. The power mode requirement detection routine shown in the flowchart of FIG. 9 is executed at preset time intervals (for example, at every several msec) by the hybrid ECU 70 in the embodiment.

Figure 9:
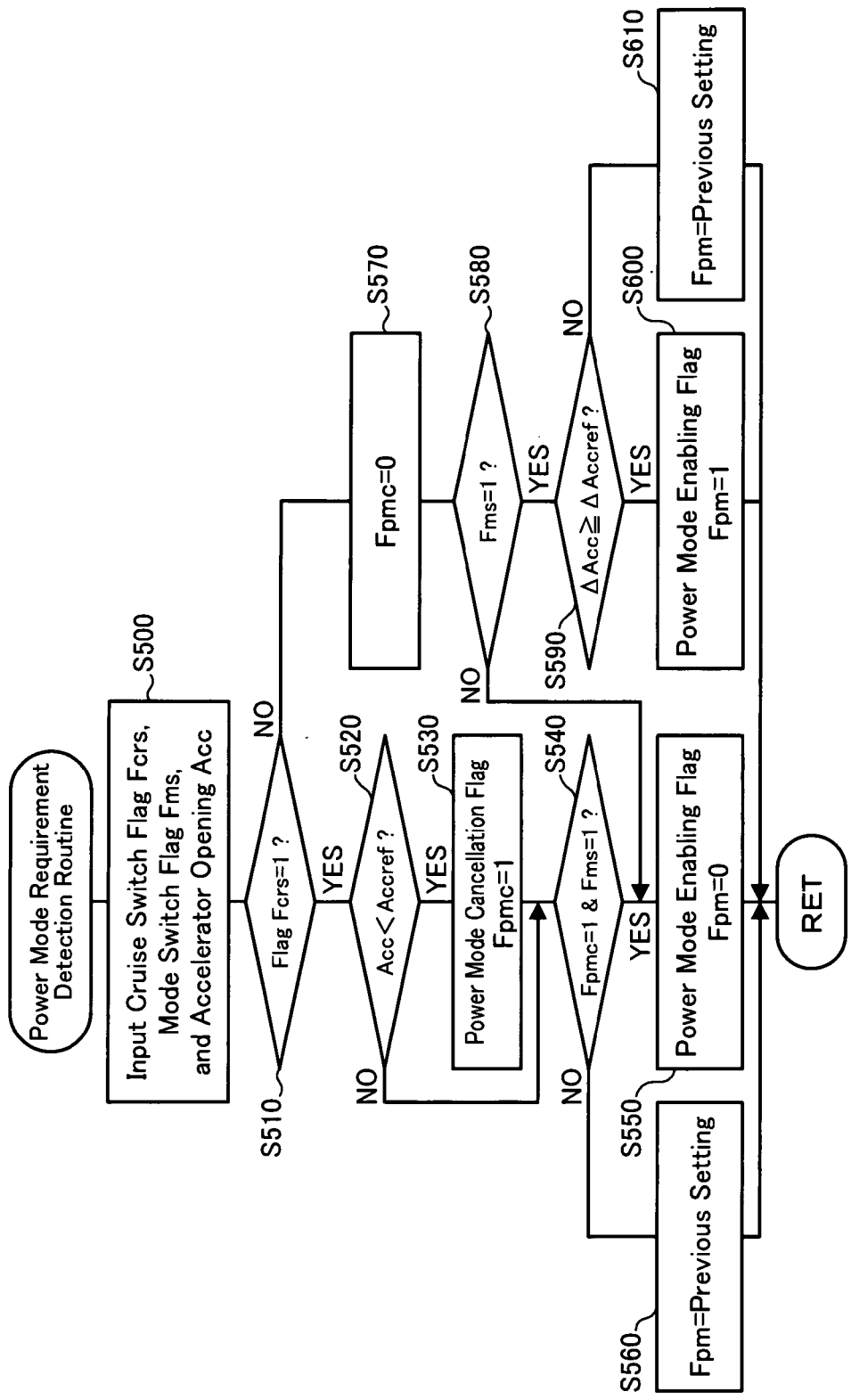
FIG. 9 is a flowchart showing a power mode requirement detection routine executed by the hybrid ECU.

On the start of the power mode requirement detection routine of FIG. 9, the CPU 72 of the hybrid ECU 70 first inputs required data for detection, that is, the setting of the cruise switch flag Fcrs, the setting of the mode switch flag Fms, and the accelerator opening Acc from the accelerator pedal position sensor 84 (step S500). The mode switch flag Fms is set in response to the driver's operation of the mode switch 88 and is stored in the predetermined memory area, as mentioned previously. After the data input at step S500, it is determined whether the input setting of the cruise switch flag Fcrs is equal to 1 (step S510). When the cruise switch flag Fcrs is equal to 1, it is further determined whether the accelerator opening Acc input at step S500 is less than a preset opening Accref (for example, 10%) (step S520). When the accelerator opening Acc is less than the preset opening Accref, a power mode cancellation flag Fpmc is set to 1 for cancellation of the power mode (step S530). The CPU 72 subsequently determines whether the power mode cancellation flag Fpmc is equal to 1 and whether the setting of the mode switch flag Fms input at step S500 is equal to 1 (this represents the driver's selection of the power mode through the operation of the mode switch 88) (step S540). When the accelerator opening Acc is not less than the preset opening Accref, on the other hand, the CPU 72 skips the processing of step S530 and immediately goes to step S540. When it is determined at step S540 that both the power mode cancellation flag Fpmc and the mode switch flag Fms are equal to 1, the CPU 72 sets the power mode enabling flag Fpm to 0 (step S550). Otherwise the CPU 72 keeps the previous setting of the power mode enabling flag Fpm unchanged (step S560). The power mode requirement detection routine then goes back to step S500 to repeat this series of processing.

When the cruise switch flag Fcrs is equal to 0 at step S510, on the other hand, the CPU 72 sets the power mode cancellation flag Fpmc to 0 (step S570) and determines whether the mode switch flag Fms is equal to 1 (step S580). When it is determined at step S580 that the mode switch flag Fms is equal to 0 representing the driver's selection of the normal mode as the object drive mode, the CPU 72 sets the power mode enabling flag Fpm to 0 (step S550) and goes back to step S500 to repeat the above series of processing. When it is determined at step S580 that the mode switch flag Fms is equal to 1 representing the driver's selection of the power mode as the object drive mode, on the other hand, the CPU 72 determines whether a difference ΔAcc (a variation in accelerator opening Acc) between the current accelerator opening Acc input at step S500 in the current cycle of the routine and a previous accelerator opening Acc input at step S500 in a previous cycle of the routine is not less than a preset reference level ΔAccref (step S590) When the difference ΔAcc is not less than the preset reference level ΔAccref, the power mode enabling flag Fpm is set to 1 (step S600). When the difference ΔAcc is less than the preset reference level ΔAccref, on the other hand, the previous setting of the power mode enabling flag Fpm is kept unchanged (step S610) During no execution of the auto cruise function (the auto cruise drive control routine of FIG. 8) with the setting of the cruise switch flag Fcrs to 0, in response to the driver's selection of the power mode through the operation of the mode switch 88, the hybrid vehicle 20 of the embodiment enables the power mode under the condition that the difference ΔAcc representing the variation in accelerator opening Acc or the degree of accelerator operation is not less than the preset reference level ΔAccref.

In the hybrid vehicle 20 of the embodiment, in expected execution of or during execution of the auto cruise function (the auto cruise drive control routine of FIG. 8) with setting of the cruise switch flag Fcrs to 1, even in the driver's selection of the power mode through the operation of the mode switch 88 (with setting of the mode switch flag Fms to 1), the power mode cancellation flag Fpmc is set to 1 (step S530) when the accelerator opening Acc is less than the preset opening Accref (that is, when the degree of accelerator operation is less than the preset reference degree). This setting gives an affirmative answer at step S540 and sets the power mode enabling flag Fpm to 0 (step S550). This prohibits the processing of step S350 and application of the accelerator opening setting map in the power mode in the auto cruise drive control routine of FIG. 8. In the power mode with setting of the power mode enabling flag Fpm to 1, in response to the driver's operation of the cruise control switch 89 to give the instruction for enabling the auto cruise function, the power mode cancellation flag Fpmc is kept to the setting of 0 as long as the accelerator opening Acc is not less than the preset opening Accref (that is, when the degree of accelerator operation is not less than the preset reference degree). This setting gives a negative answer at step S540 and keeps the power mode enabling flag Fpm to the setting of 1 (step S560). This allows the processing of step S350 and application of the accelerator opening setting map in the power mode in the auto cruise drive control routine of FIG. 8. The hybrid vehicle 20 of the embodiment allows the processing of step S350 and application of the accelerator opening setting map in the power mode in the auto cruise drive control routine of FIG. 8 during execution of the auto cruise function, only when the power mode is selected prior to the driver's instruction for enabling the auto cruise function and when the degree of accelerator operation is not less than the preset reference degree after the instruction for enabling the auto cruise function.

As described above, in response to the driver's operation of the mode switch 88, the hybrid vehicle 20 of the embodiment selects the object drive mode between the normal mode (first drive mode) for ordinary driving and the power mode (second drive mode) having the better response of torque output to the driver's accelerator operation than the response in the normal mode. When the instruction for enabling the auto cruise function is not given by the operation of the cruise control switch 89 with setting of the cruise switch flag Fcrs to 0, the power mode enabling flag Fpm is set basically according to the driver's operation of the mode switch 88 (steps S570 to S610 in FIG. 9). The torque demand Tr* is set based on the accelerator opening Acc representing the driver's accelerator operation amount (and the vehicle speed V), the torque demand setting map, and either the accelerator opening setting map in the normal mode or the accelerator opening setting map in the power mode selected as the driving force setting restriction corresponding to selection of the object drive mode between the normal mode and the power mode. The operations of the engine 22 and the motors MG1 and MG2 are then controlled to ensure output of a torque equivalent to the torque demand Tr* (see FIG. 2). When the driver operates the cruise control switch 89 to give the instruction for enabling the auto cruise function with setting of the cruise switch flag Fcrs to 1, on the other hand, the power mode enabling flag Fpm is basically set to 0, regardless of selection of either the normal mode or the power mode as the object drive mode (steps S550 and S560 in FIG. 9). In this case, the torque demand Tr* is set with restriction for execution of the auto cruise function without using the accelerator opening setting map in the power mode as the driving force setting restriction corresponding to the power mode (steps S320 to S340, S360, and S370 in FIG. 8). The operations of the engine 22 and the motors MG1 and MG2 are then controlled to ensure output of a torque equivalent to the torque demand Tr* (see FIG. 8). The power mode having the tendency of the better response of torque output to the driver's accelerator operation than the response in the normal mode for ordinary driving is typically selected in response to requirement for a relatively large driving force, for example, at the time of acceleration or hill climbing. There is a very little possibility for the driver's selection of the power mode in combination with the instruction for enabling the auto cruise function having basically no requirement for the accelerator operation. When the driver gives the instruction for enabling the auto cruise function, the hybrid vehicle 20 of the embodiment executes the auto cruise function without using the accelerator opening setting map in the power mode, regardless of selection of either the normal mode or the power mode as the object drive mode. Such relatively simple control ensures adequate execution of the auto cruise function with preventing the driver from feeling awkward with a variation in driving force. When the driver gives the instruction for enabling the auto cruise function, the greater between the vehicle speed difference-based torque demand Trv (first tentative driving force demand) and the accelerator operation-based torque demand Tra (second tentative driving force demand) is set to the torque demand Tr* (steps S320, S340, S360, and S370 in FIG. 8). The vehicle speed difference-based torque demand Trv is based on the auto cruise-related driving parameters, such as the vehicle speed V and the target vehicle speed V*. The accelerator operation-based torque demand Tra is based on the accelerator opening Acc (and the vehicle speed V), the accelerator opening setting map in the normal mode, and the torque demand setting map. Such control ensures accurate execution of the auto cruise function with allowing the driver to give a request for increasing the driving force through the accelerator operation.

In the hybrid vehicle 20 of the embodiment, when the driver gives the instruction for enabling the auto cruise function with selection of the power mode as the object drive mode, the power mode enabling flag Fpm is exceptionally kept to the setting of 1 as long as the accelerator opening Acc is not less than the preset opening Accref (when the degree of accelerator operation is not less than the preset reference degree) (step S560). In this state, the engine 22 and the motors MG1 and MG2 are controllable to ensure output of a torque equivalent to the torque demand Tr*, which is set according to the accelerator opening Acc, the accelerator opening setting map in the power mode, and the torque demand setting map (step S370). When the driver gives the instruction for enabling the auto cruise function with selection of the power mode as the object drive mode, as long as the accelerator opening Acc is not less than the preset opening Accref, the hybrid vehicle 20 of the embodiment sets the greater between the vehicle speed difference-based torque demand Trv (first tentative driving force demand) and the accelerator operation-based torque demand Tra (second tentative driving force demand) to the torque demand Tr* (steps S320 and S350 to S370 in FIG. 8). The vehicle speed difference-based torque demand Trv is based on the auto cruise-related driving parameters, such as the vehicle speed V and the target vehicle speed V*. The accelerator operation-based torque demand Tra is based on the accelerator opening Acc (and the vehicle speed V), the accelerator opening setting map in the power mode, and the torque demand setting map. The operations of the engine 22 and the motors MG1 and MG2 are then controlled to ensure output of a torque equivalent to the torque demand Tr* (steps S380 to S450 in FIG. 8). Namely in the case of the driver's instruction for enabling the auto cruise function with selection of the power mode, such control adequately allows the hybrid vehicle 20 to be driven with reference to the accelerator opening setting map in the power mode when the degree of accelerator operation is not less than the preset reference degree. In the case of the driver's instruction for enabling the auto cruise function with selection of the power mode, a relatively large driving force may be required, for example, with a view to overtaking the leading vehicle or climbing on the upslope. During selection of the power mode as the object drive mode, in response to the driver's instruction for enabling the auto cruise function, the hybrid vehicle 20 is allowed to be driven with reference to the accelerator opening setting map in the power mode as long as the degree of accelerator operation is not less than the preset reference degree. Such control ensures the good response to the driver's requirement and thereby improves the operability of the vehicle. In the case of the driver's instruction for enabling the auto cruise function in the unintentional continuous selection of the power mode, for example, due to an operation miss of the mode switch 88, the ordinary auto cruise function is executed without using the accelerator opening setting map in the power mode when the degree of accelerator operation is less than the preset reference degree or after the degree of accelerator operation decreases below the preset reference degree. Such control effectively prevents the driver from feeling awkward due to non-execution of the desired auto cruise function against the driver's instruction.

Figure 10:
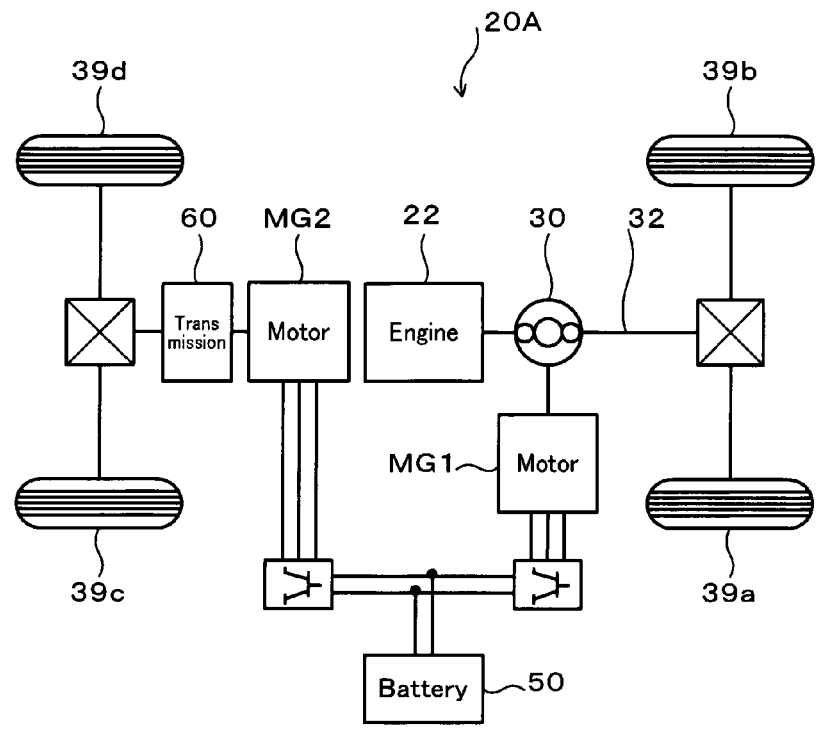
FIG. 10 schematically illustrates the configuration of another hybrid vehicle in one modified example.
Figure 11:
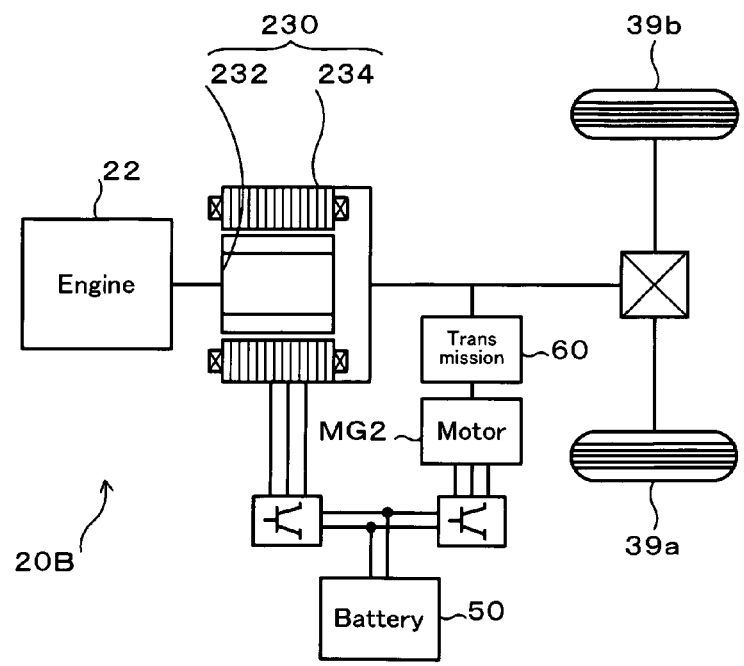
FIG. 11 schematically illustrates the configuration of still another hybrid vehicle in another modified example.
Figure 12:
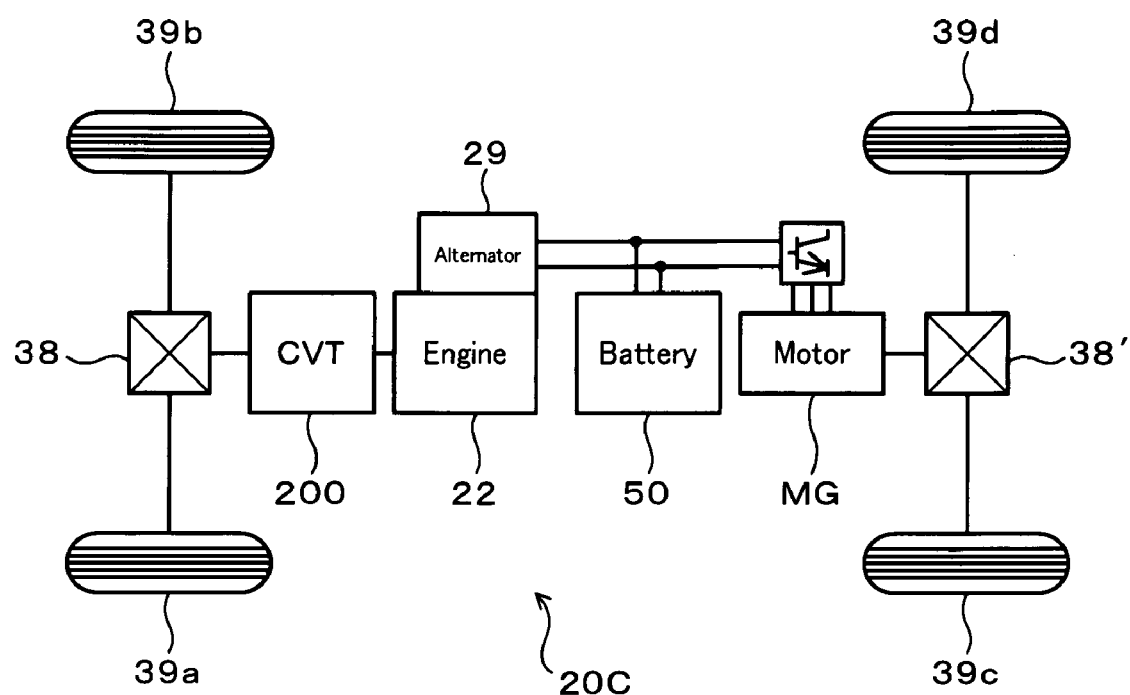
FIG. 12 schematically illustrates the configuration of another hybrid vehicle in still another modified example.

In the hybrid vehicle 20 of the embodiment, the ring gear shaft 32*a* is linked with the motor MG2 via the reduction gear 35 of reducing the rotation speed of the motor MG2 and transmitting the reduced rotation speed to the ring gear shaft 32*a*. The reduction gear 35 is, however, not essential but may be replaced by a transmission that has two different speeds, Hi and Lo, or three or more different speeds and changes the rotation speed of the motor MG2 and transmits the changed rotation speed to the ring gear shaft 32*a*. In the hybrid vehicle 20 of the embodiment, the power of the motor MG2 is output to the axle linked with the ring gear shaft 32*a*. The technique of the invention is, however, not restricted to this configuration but is also applicable to a hybrid vehicle 20A of one modified structure shown in FIG. 10. In the hybrid vehicle 20A of FIG. 10, the power of the motor MG2 is output to another axle (an axle linked with wheels 39*c* and 39*d*) that is different from the axle connecting with the ring gear shaft 32*a* (the axle linked with the drive wheels 39*a* and 39*b*). In the hybrid vehicle 20 of the embodiment, the power of the engine 22 is transmitted via the power distribution integration mechanism 30 to the ring gear shaft 32*a* as the axle linked with the drive wheels 39*a* and 39*b*. The technique of the invention is, however, not restricted to this configuration but is also applicable to a hybrid vehicle 20B of another modified structure shown in FIG. 11. The hybrid vehicle 20B of FIG. 11 is equipped with a pair-rotor motor 230. The pair-rotor motor 230 includes an inner rotor 232 connected to a crankshaft of the engine 22 and an outer rotor 234 connected to an axle for power output to the drive wheels 39*a* and 39*b*. The pair-rotor motor 230 transmits part of the output power of the engine 22 to the axle, while converting the residual engine output power into electric power. The technique of the invention may further be applicable to a vehicle equipped with a continuous variable transmission (CVT) as the power transmission structure for transmission of the power of the engine 22 to the axle, in place of the power distribution integration mechanism 30. A hybrid vehicle 20C shown in FIG. 12 is one example of this modification. The hybrid vehicle 20C of FIG. 12 has a front wheel driving system of outputting the power of an engine 22 to front wheels 39*a* and 39*b* via a belt-type or a toroidal-type CVT 200 and a differential gear 38 and a rear wheel driving system of outputting the power of a motor MG as a synchronous motor generator to rear wheels 39*c* and 39*d* via a differential gear 38'. The motor MG is connected with an alternator 29 driven via an inverter by the engine 22 and with a battery 50 having an output terminal linked with a power line from the alternator 29. The motor MG is accordingly driven with electric power of the alternator 29 or with electric power discharged from the battery 50, while generating electric power by regenerative control to charge the battery 50.

The primary elements in the embodiment and its modified examples are mapped to the primary constituents in the claims of the invention as described below. The engine 22 in the embodiment and its modified examples described above corresponds to the 'internal combustion engine' of the invention. The motor MG2 or the motor MG2 corresponds to the 'motor' of the invention. The battery 50 that transmits electric power to and from the motor MG2 or the motor MG is equivalent to the 'accumulator' of the invention. The accelerator pedal position sensor 84 is equivalent to the 'accelerator operation amount detector' of the invention. The mode switch 88 for selection of either the normal mode or the power mode as the object drive mode corresponds to the 'drive mode selector' of the invention. The cruise control switch 89 corresponds to the 'auto cruise selector' of the invention. The hybrid ECU 70 executing the power mode requirement detection routine of FIG. 9, the hybrid ECU 70, the engine ECU 24, and the motor ECU 40 executing the drive control routine of FIG. 2, and the hybrid ECU 70, the engine ECU 24, and the motor ECU 40 executing the auto cruise drive control routine of FIG. 8 correspond to the 'controller' of the invention. The hybrid ECU 70 executing the processing of steps S130 to S150 in the drive control routine of FIG. 2 and the processing of steps S320 to S370 in the auto cruise drive control routine of FIG. 8 is equivalent to the 'driving force demand setting module' of the invention. The combination of the motor MG1 and the power distribution integration mechanism 30, the pair-rotor motor 230, or the CVT 200 corresponds to the 'power transmission structure' of the invention. The combination of the motor MG1 and the power distribution integration mechanism 30 or the pair-rotor motor 230 corresponds to the 'electric power-mechanical power input output assembly' of the invention. The motor MG1 and the power distribution integration mechanism 30 are respectively equivalent to the 'generator' and the three shaft-type power input output structure, of the invention.

The 'internal combustion engine' is not restricted to the engine 22 that receives a supply of a hydrocarbon fuel, such as gasoline or light oil, and outputs power, but may be an engine of any other design, for example, a hydrogen engine. The 'motor' is not restricted to the synchronous motor generator, such as the motor MG2 or the motor MG, but may be a motor of any other design, for example, an induction motor. The 'accumulator' is not restricted to a secondary battery such as the battery 50 but may be an accumulator of any other design that transmits electric power to and from the motor, for example, a capacitor. The 'accelerator operation amount detector' is not restricted to the accelerator pedal position sensor 84 but may be a detector of any other design that acquires the amount of the driver's accelerator operation. The 'drive mode selector' is not restricted to the mode switch 88 but may be a selector of any other design that selects the object drive mode between the first drive mode for ordinary driving, such as the normal mode, and the second drive mode having the tendency of the better response of power output to the driver's accelerator operation than the response in the first drive mode, such as the power mode. The 'auto cruise selector' is not restricted to the cruise control switch 89 but may be a selector of any other design that gives an instruction for enabling a preset auto cruise function, for example, constant speed driving or follow-up driving. The 'auto cruise function' may be any of the driver's driving supports and aids, such as the constant speed driving or the follow-up driving. The 'controller' is not restricted to the combination of the hybrid ECU 70, the engine ECU 24, and the motor ECU 40 but may be a controller of any other design that, in the case of no instruction for enabling the preset auto cruise function, controls the internal combustion engine and the motor to ensure output of a power equivalent to the driving force demand, which is set based on the acquired amount of the driver's accelerator operation and the driving force setting restriction corresponding to either the first drive mode or the second drive mode selected as the object drive mode, while, in the case of the instruction for enabling the preset auto cruise function, controlling the internal combustion engine and the motor to ensure output of a power equivalent to the driving force demand, which is set based on the restriction for execution of the auto cruise function basically without using the driving force setting restriction corresponding to the second drive mode, regardless of selection of either the first drive mode or the second drive mode as the object drive mode. The 'power transmission structure' is not restricted to the combination of the motor MG1 and the power distribution integration mechanism 30, the pair-rotor motor 230, or the CVT 200, but may be any other suitable design that has an axle rotational element connecting with a specific axle and an engine rotational element connecting with an engine shaft of an internal combustion engine and allowing differential rotation relative to the axle rotational element and enables transmission of at least part of output power from the engine shaft to the axle. The 'degree of accelerator operation' is not restricted to the accelerator operation amount such as the accelerator opening Acc or the variation in accelerator operation amount such as the difference ΔAcc in accelerator opening. Incidentally, the corresponding relationship between the principal elements of the embodiment and modifications thereto and the principal elements of the present invention described in Summary of the Invention, does not limit the elements of the present invention described in Summary of the Invention, because the embodiment is an example to concretely describe the best mode for carrying out the present invention described in Summary of the Invention. This is because the interpretation of the present invention described in Summary of the Invention should be performed on the basis of the descriptions given in Summary of the Invention, and because the embodiment is a concrete example of the present invention described in Summary of the Invention.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2007-65538 filed on Mar. 14, 2007 including specification, drawings and claims are incorporated herein by reference in their entirety.

What is claimed is:
1. A hybrid vehicle, comprising:
an internal combustion engine configured to output power for driving;
a motor configured to output power for driving;
an accumulator configured to transmit electric power to and from the motor;
an accelerator operation amount detector configured to acquire an amount of a driver's accelerator operation;
a drive mode selector configured to select an object drive mode between a first drive mode for ordinary driving and a second drive mode having a tendency of a better response of power output to the driver's accelerator operation than a response in the first drive mode;
an auto cruise selector configured to give an instruction for enabling a preset auto cruise function; and
a controller configured to, in the case of no instruction for enabling the preset auto cruise function, control the internal combustion engine and the motor to ensure output of a power equivalent to a driving force demand, which is set based on the acquired amount of the driver's accelerator operation and a driving force setting restriction corresponding to either the first drive mode or the second drive mode selected as the object drive mode, and, in the case of the instruction for enabling the preset auto cruise function, to control the internal combustion engine and the motor to ensure output of a power equivalent to the driving force demand, which is set based on a restriction for execution of the preset auto cruise function without using a driving force setting restriction corresponding to the second drive mode, regardless of selection of either the first drive mode or the second drive mode as the object drive mode.

2. The hybrid vehicle in accordance with claim 1, wherein in the case of the instruction for enabling the preset auto cruise function with selection of the second drive mode as the object drive mode, the controller controls the internal combustion engine and the motor to ensure output of a power equivalent to the driving force demand, which is set based on the acquired amount of the driver's accelerator operation and the driving force setting restriction corresponding to the second drive mode, as long as the acquired degree of the driver's accelerator operation is not less than a preset reference degree.

3. The hybrid vehicle in accordance with claim 1, the hybrid vehicle further comprising:
a driving force demand setting module configured to, in the case of no instruction for enabling the preset auto cruise function, set the driving force demand based on the acquired amount of the driver's accelerator operation and the driving force setting restriction corresponding to either the first drive mode or the second drive mode selected as the object drive mode, and, in the case of the instruction for enabling the preset auto cruise function, to set the greater between a first tentative driving force demand based on a predetermined auto cruise-related driving parameter and a second tentative force demand based on the acquired amount of the driver's accelerator operation and a driving force setting restriction corresponding to the first drive mode, to the driving force demand.

4. The hybrid vehicle in accordance with claim 3, wherein in the case of the instruction for enabling the preset auto cruise function with selection of the second drive mode as the object drive mode, the driving force demand setting module sets the greater between the first tentative driving force demand based on the predetermined auto cruise-related driving parameter and the second tentative driving force demand based on the acquired amount of the driver's accelerator operation and the driving force setting restriction corresponding to the second drive mode, to the driving force demand as long as the acquired degree of the driver's accelerator operation is not less than a preset reference degree.

5. The hybrid vehicle in accordance with claim 1, the hybrid vehicle further comprising:
a power transmission structure constructed to have an axle rotational element connecting with a specific axle and an engine rotational element connecting with an engine shaft of the internal combustion engine and allowing differential rotation relative to the axle rotational element and configured to enable output of at least part of power from the engine shaft to the axle,
wherein the motor outputs power to either the specific axle or another axle different from the specific axle.

6. The hybrid vehicle in accordance with claim 5, wherein the power transmission structure has an electric power-mechanical power input output assembly constructed to connect with the axle and with the engine shaft of the internal combustion engine and configured to enable at least part of the output power of the internal combustion engine to the axle and transmission of electric power to and from the accumulator through input and output of electric power and mechanical power.

7. The hybrid vehicle in accordance with claim 6, wherein the electric power-mechanical power input output assembly has: a generator configured to input and output power; and a three shaft-type power input output structure constructed to connect with three shafts, the axle, the engine shaft of the internal combustion engine, and a rotating shaft of the generator and configured to input and output power to and from a residual shaft based on powers input to and output from any two shafts among the three shafts.

8. A control method of a hybrid vehicle, where the hybrid vehicle has: an internal combustion engine configured to output power for driving; a motor configured to output power for driving; an accumulator configured to transmit electric power to and from the motor; an accelerator operation amount detector configured to acquire an amount of a driver's accelerator operation; a drive mode selector configured to select an object drive mode between a first drive mode for ordinary driving and a second drive mode having a tendency of a better response of power output to the driver's accelerator operation than a response in the first drive mode; and an auto cruise selector configured to give an instruction for enabling a preset auto cruise function,
the control method comprising:
(a) in the case of no instruction for enabling the preset auto cruise function, controlling the internal combustion engine and the motor to ensure output of a power equivalent to a driving force demand, which is set based on the acquired amount of the driver's accelerator operation and a driving force setting restriction corresponding to either the first drive mode or the second drive mode selected as the object drive mode, while, in the case of the instruction for enabling the preset auto cruise function, controlling the internal combustion engine and the motor to ensure output of a power equivalent to the driving force demand, which is set based on a restriction for execution of the preset auto cruise function without using a driving force setting restriction corresponding to the second drive mode, regardless of selection of either the first drive mode or the second drive mode as the object drive mode.

9. The control method of the hybrid vehicle in accordance with claim 8, wherein the step (a) in the case of the instruction for enabling the preset auto cruise function with selection of the second drive mode as the object drive mode, controlling the internal combustion engine and the motor to ensure output of a power equivalent to the driving force demand, which is set based on the acquired amount of the driver's accelerator operation and the driving force setting restriction corresponding to the second drive mode, as long as the acquired degree of the driver's accelerator operation is not less than a preset reference degree.

10. The control method of the hybrid vehicle in accordance with claim 8, the control method further comprising:
(b) in the case of no instruction for enabling the preset auto cruise function, setting the driving force demand based on the acquired amount of the driver's accelerator operation and the driving force setting restriction corresponding to either the first drive mode or the second drive mode selected as the object drive mode, while, in the case of the instruction for enabling the preset auto cruise function, setting the greater between a first tentative driving force demand based on a predetermined auto cruise-related driving parameter and a second tentative force demand based on the acquired amount of the driver's accelerator operation and a driving force setting restriction corresponding to the first drive mode, to the driving force demand.

11. The control method of the hybrid vehicle in accordance with claim 10, wherein the step (b) in the case of the instruction for enabling the preset auto cruise function with selection of the second drive mode as the object drive mode, setting the greater between the first tentative driving force demand based on the predetermined auto cruise-related driving parameter and the second tentative driving force demand based on the acquired amount of the driver's accelerator operation and the driving force setting restriction corresponding to the second drive mode, to the driving force demand as long as the acquired degree of the driver's accelerator operation is not less than a preset reference degree.

12. The control method of the hybrid vehicle in accordance with claim 8, the hybrid vehicle further comprising:
a power transmission structure constructed to have an axle rotational element connecting with a specific axle and an engine rotational element connecting with an engine shaft of the internal combustion engine and allowing differential rotation relative to the axle rotational element and configured to enable output of at least part of power from the engine shaft to the axle,
wherein the motor outputs power to either the specific axle or another axle different from the specific axle.

13. The control method of the hybrid vehicle in accordance with claim 12, wherein the power transmission structure has an electric power-mechanical power input output assembly constructed to connect with the axle and with the engine shaft of the internal combustion engine and configured to enable at least part of the output power of the internal combustion engine to the axle and transmission of electric power to and from the accumulator through input and output of electric power and mechanical power.

14. The control method of the hybrid vehicle in accordance with claim 13, wherein the electric power-mechanical power input output assembly has: a generator configured to input and output power; and a three shaft-type power input output structure constructed to connect with three shafts, the axle, the engine shaft of the internal combustion engine, and a rotating shaft of the generator and configured to input and output power to and from a residual shaft based on powers input to and output from any two shafts among the three shafts.

\* \* \* \* \*